United States Patent [19]

Langhammer

[11] 4,083,715
[45] Apr. 11, 1978

[54] SMELTING PLANT AND METHOD

[75] Inventor: Hans Jurgen Langhammer, Platjenwerbe, Germany

[73] Assignee: Klockner-Werke AG, Duisburg, Germany

[21] Appl. No.: 689,859

[22] Filed: May 25, 1976

[51] Int. Cl.² .................................................. C21C 5/00
[52] U.S. Cl. ........................................ 75/43; 75/44 S; 75/65 R
[58] Field of Search ................ 75/43, 40, 41, 10 R, 75/65 R, 12, 44 S; 266/168, 227, 236

[56] References Cited

U.S. PATENT DOCUMENTS

| | | | |
|---|---|---|---|
| 3,788,837 | 1/1974 | Geck et al. | 75/44 S |
| 3,894,864 | 7/1975 | Langhammer | 75/44 S |
| 3,897,243 | 7/1975 | Langhammer | 75/44 S |
| 3,948,641 | 4/1976 | Langhammer | 75/44 S |
| 3,948,642 | 4/1976 | Gross | 75/12 |
| 3,964,897 | 6/1976 | Langhammer | 75/44 S |
| 3,976,472 | 8/1976 | Linder | 75/10 R |
| 3,996,044 | 12/1976 | Petritsch | 75/10 R |

Primary Examiner—Walter R. Satterfield
Attorney, Agent, or Firm—Michael J. Striker

[57] ABSTRACT

Iron-containing materials are loaded into the top of a shaft furnace to form therein an upright column of the materials. A burner forms a flame above the floor of the furnace to heat the base of the column and thereby melt the materials at the base of the column into a liquefied-iron melt on the floor of the furnace and a layer of slag on the melt. In addition this flame formed by the burner forms a deposit in the furnace on which the column is supported. Slag is continuously withdrawn from the furnace at a location substantially level with the deposit and the melt is withdrawn from the furnace at a location below the layer of slag and is heated as it is withdrawn. This melt is withdrawn through an iron-drain conduit having an outlet end vertically positioned to be horizontally even with the lower surface of the slag and a refining vessel working inductively or by means of an electric arc may be provided in this outlet conduit for the continuous transformation of the liquefied iron into steel.

5 Claims, 5 Drawing Figures

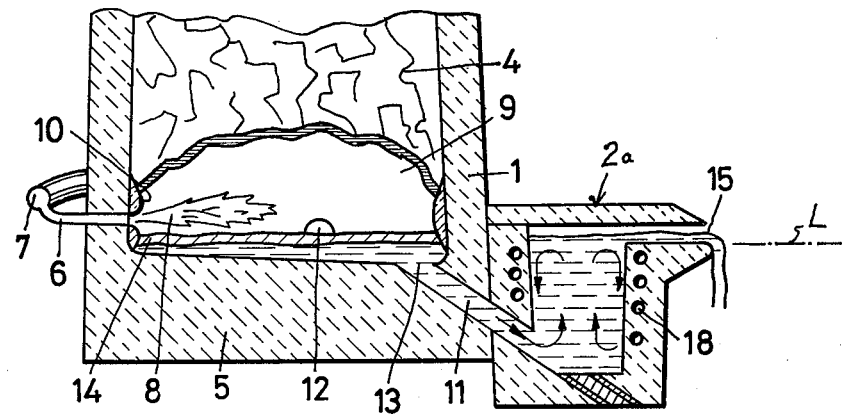
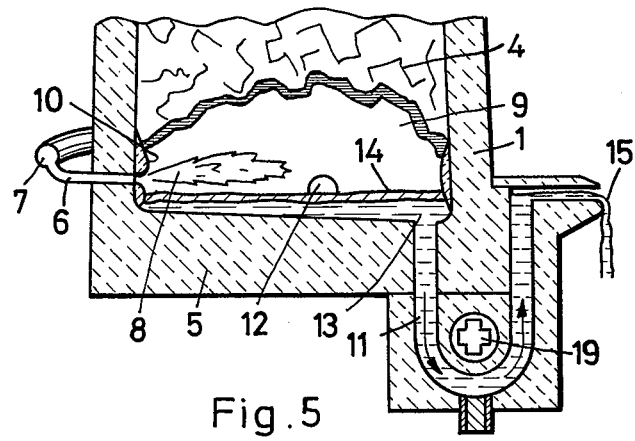
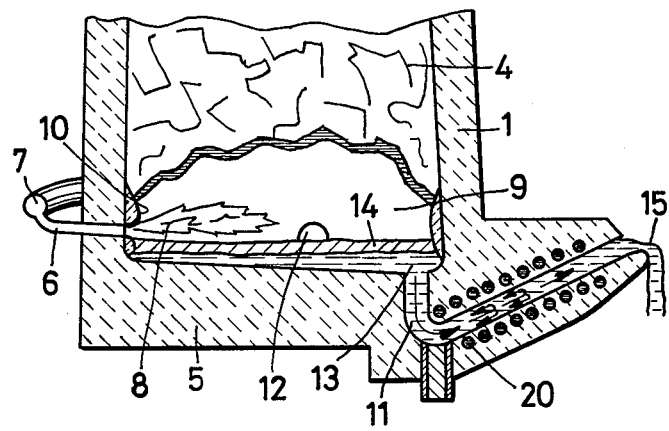

SMELTING PLANT AND METHOD

BACKGROUND OF THE INVENTION

The present invention relates to a method of and an apparatus for smelting. More particularly this invention concerns a system and plant for smelting and refining iron in a shaft furnace.

It is possible in a shaft furnace to smelt iron-containing scrap, sponge iron, pelletized iron-containing ore, iron dross, and the like by introducing this iron-containing material into the top of the furnace to form therein an upright column of such material. A burner heats the base of the column to form at the bottom of the shaft furnace a liquified-iron melt covered by a layer of slag. In addition this burner causes the formation of a scale or deposit on the refractory lining of the furnace and the column is supported on this deposit as described in my copending and commonly owned patent application Ser. No. 651,526 filed Jan. 22, 1976.

The burner at the bottom of the furnace typically mixes right in the furnace oxygen and combustible. This hot flame and the extremely active FeO slag tend to eat away the refractory furnace lining at the floor and lower regions of the walls of the furnace. It is essential to minimize this erosion in the furnace as well as in any other treatment vessels. Also the liquified iron in the melt at the bottom of the furnace must not be allowed to solidify.

SUMMARY OF THE INVENTION

It is therefore an object of the present invention to provide an improved method of and apparatus for smelting which advances principles set forth in my above-cited application Ser. No. 651,526.

Yet another object is the provision of an improved smelting method and plant which minimizes the damage that can be done by the very hot and corrosive FeO slag to the furnace lining without solidification of this melt.

These objects are attained according to the present invention in a shaft furnace wherein slag is continuously withdrawn from the furnace at a location substantially level with the deposit formed by the flame above the floor of the furnace and the melt is withdrawn from the furnace at a location which determines the vertical position of the undersurface of the layer of slag and the melt is heated as it is withdrawn. In accordance with this invention the shaft furnace is provided with an iron-drain conduit having an inlet end opening into the furnace below the slag layer and an outlet end substantially at level of the undersurface of the slag layer so that the iron passes out of the furnace through the conduit and remains at a level in the furnace determined by the level of the outlet end. This conduit may have an intermediate portion higher than both of its ends so as to function like a siphon. In effect the drain passage acts as a trap, permitting the liquified iron to flow out, but preventing reverse entry of air or any other fluid back into the furnace.

Thus in accordance with the present invention the highly active ferrous-oxide slag is continuously removed from the shaft oven as it forms. Later stages in the plant are therefore not subjected to this highly active material and even a possible reaction between this slag and the lining of the furnace is minimized since the slag layer is maintained at the level of the continuously renewed iron-scale deposit in the furnace. Since the liquid iron tends to flow down over this scale to the bottom of the furnace the slag practically does not come into contact with the lining of the furnace so that the service life of this lining is increased considerably. Furthermore the oxidizing region inside the smelting zone is completely separated from any subsequent reducing stage.

According to yet another feature of this invention the melt is indirectly heated as it is withdrawn. It is possible to effect this by means of an induction coil according to the present invention or by means of refining electrodes in a refining vessel provided between the ends of the iron-drain conduit. In the latter case in accordance with this invention the slag drain is provided with a lateral branch that feeds a minor portion of the slag into this refining vessel so that the iron can be continuously refined into steel directly as it is withdrawn from the blast furnace.

When particularly pure materials are loaded into the blast furnace in accordance with this invention it is possible merely to heat the iron-drain conduit in order to prevent solidification of the melt in it or in the bottom of the furnace. This also serves to make the melt more fluent and to protect the floor of the furnace from the heat of the flame and chemical activity of the slag. In such an arrangement the automatic separation-out of the slag directly in the furnaces gives a very pure and a readily usable product.

It is therefore possible according to the present invention to process relatively impure iron ores in a furnace without rapidly wearing out the lining of this furnace. The lining is, indeed, continuously protected both by the liquid-metal melt at the bottom of the furnace and by the deposit formed naturally in the furnace by the burner. Virtually any metal-containing material can be loaded into the top of such a furnace and relatively pure metal can be withdrawn from the bottom. In particular the system can be used for the production of steel. The combination of this system with the subsequent refining step makes it possible continuously to produce steel from the most disparate products.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIGS. 3, 4 and 5 are vertical sectional views similar to FIG. 1 illustrating further arrangements in accordance with the present invention.

DESCRIPTION OF THE PREFERRED EMBODIMENTS

Figure 1:
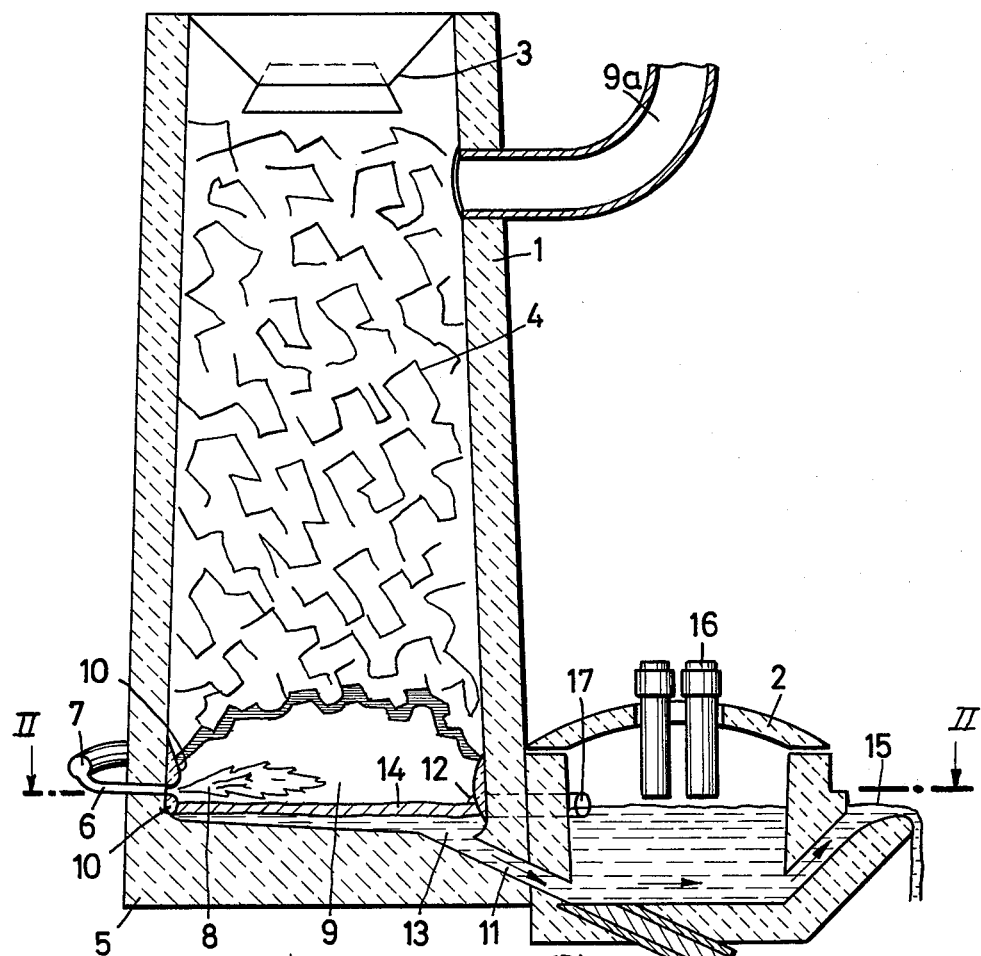
FIG. 1 is a vertical section through a plant according to the present invention.

As shown in FIG. 1 a shaft furnace 1 is provided at its upper end with a bell 3 that allows iron-containing materials to be introduced into this furnace to form a column 4 therein. This furnace tapers slightly upwardly and is made of or lined with refractory material.

Above the floor 5 of this furnace there is provided a plurality of burner tubes 6 connected to a common manifold 7. Each such burner tube is actually formed as two concentric tubes to the inner one of which is fed pure oxygen and to the outer one of which is fed a combustible gas or atomized fuel so that a flame 8 is produced in the lower region 9 of the furnace 1 directly above the floor 5. This flame 8 heats the base of the column 4 and causes an iron-scale deposit to form on the lining of the furnace 1. The column 4 is supported on this deposit 10 which also serves to protect the furnace lining from the flame 8. An outlet pipe 9a serves to draw exhaust gases out of the top of the furnace 1. Such an arrangement is described in my above-cited application Ser No. 651,526 whose entire disclosure is herewith incorporated by reference.

Figure 2:
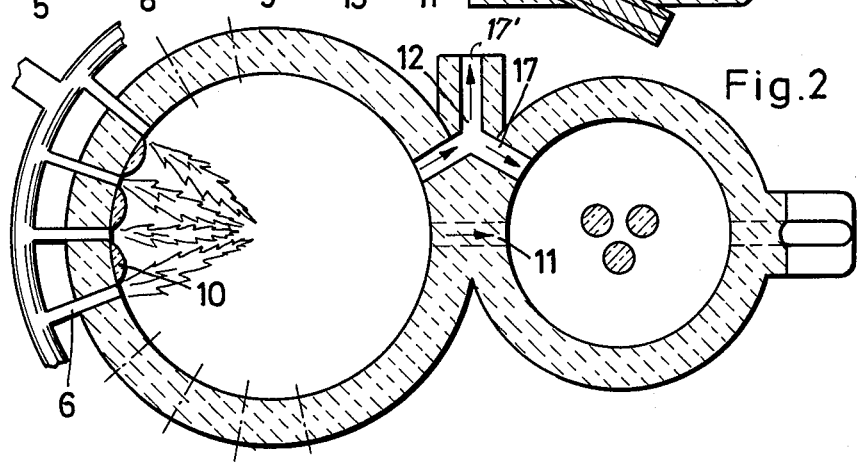
FIG. 2 is a section taken along line II—II of FIG. 1.

It is possible to use an annular burner spaced inwardly from the walls of the furnace or to use a central flame in the furnace 1 instead of the plurality of burners 6 which open radially into the furnace as shown in FIGS. 1 and 2. In all such cases deposits 10 in the form of annular bosses are formed inside the furnace 1, although they may also be formed on the floor 5 thereof.

The flame or flames 8 liquifies iron in the column 4 and causes it to flow down over the deposits 10 and form a liquified-iron melt 13 lying on the base 5 of the furnace 1, and a layer 14 of ferrous-oxide slag on top of this melt 13. The floor 5 is inclined downwardly toward a drain outlet 11 that opens into the bottom of a refining vessel 2. This drain 11 opens inside the furnace below the level of the slag 14. In addition there is provided another drain 12 which opens above the drain 11 and at the level of the slag 14. This drain 12 terminates at 17 in the vessel 2 above the drain 11. In addition another drain 15 extends from the bottom of the vessel 2 up to a level horizontally even with the underside of the layer 14. The height of the outlet end of the drain 15 therefore determines the depth of the melt 13 in the vessel 2 and in the bottom of the furnace 1. The slag 14 always floats on top of this melt so that a slag layer will be formed both in the furnace 1 and in the vessel 2 on top of the melt.

Electrodes 16 are provided in the vessel 2 and serve to refine the iron therein into steel which exits at 15 from the vessel 2. Furthermore it is noted as best shown in FIG. 2 that most of the slag is drawn off from the slag drain 12 via a branch 17' as all of the slag produced in the furnace 1 is not needed in the refining vessel 2.

The arrangement of FIG. 3 is identical to that of FIG. 1, with common reference numerals being used for identical structure. Here, however, a vessel 2a is provided which has an induction coil 18 that serves inductively to heat the iron coming out of the drain 11 before it exits via the drain 15. In this arrangement also the iron-drain 11, 15 has its outlet and at a level L horizontally even with or slightly above the underside of the slag layer 14 and serving to establish the depth of the melts 13 in the furnace 1 and in the vessel 2a.

The arrangement of FIG. 4 has an inductive heater 19 provided adjacent the drain 11 and serving to superheat the iron and to prevent it from solidifying as it is drawn out of the furnace 1. Such an arrangement is particularly usable when relatively pure starting products are loaded into the furnace 1 to form the column 4 so that the melt drawn off at 11 is usable as is.

In the arrangement of FIG. 5 and inductive coil 20 surrounds the drain outlet conduit 11. This coil 20, like the heater 19 and coil 18 is connected to a suitable source of electrical power and insures that the iron does not solidify before it exits from the drain 15.

With the arrangement described above it is possible continuously to smelt iron, using a wise variety of starting products. The lining of the furnace 1 is protected by the melt 13 and the deposit 10 so that the service life of this furnace is greatly increased. Furthermore it is possible to operate continuously since the slag is withdrawn at 12 above the level L.

It will be understood that each of the elements described above, or two or more together, may also find a useful application in other types of systems differing from the types described above.

While the invention has been illustrated and described as embodied in iron-smelting systems, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a method of smelting iron-containing materials wherein said materials descend as a column in a shaft furnace above the floor thereof and are heated adjacent said floor so as to form thereon a liquefied-iron melt on which floats a layer of slag and to form on the inside wall of said furnace an iron-scale deposit, the improvement comprising the step of withdrawing liquefied iron from said melt and slag from said layer in such manner that said layer of slag always remains at the level of said deposit and said wall is thereby protected from said slag by said deposit.

2. A method of smelting comprising the steps of:
   feeding iron-containing materials into the top of a shaft furnace to form therein an upright column of said materials;
   forming a flame above the floor of said furnace;
   heating the base of said column with said flame to melt the materials at the base of said column into a liquefied-iron melt on said floor and a layer of slag on the surface of said melt and to form in said furnace adjacent said base and on the wall of said furnace a deposit;
   supporting said column on said deposit;
   withdrawing said slag from said furnace at a location substantially level with said deposit and above said surface in such a manner that said slag in said furnace remains generally level with said deposit;
   withdrawing said melt from said furnace at a location below said surface of said melt continuously in such a manner that said surface remains generally level with said deposit, whereby the wall of said furnace is protected from said slag by said deposit; and
   heating the withdrawn melt continuously during the withdrawal thereof to maintain same molten.

3. The method defined in claim 2 wherein as said melt is withdrawn from said furnace said melt is conducted along a path having an upstream end at said location below said surface and a downstream end substantially level with said surface, said path lying entirely below its said ends.

4. The method defined in claim 2 wherein said flame is formed by mixing and burning oxygen and a combustible in said furnace in a region level with said deposit, whereby said walls of said furnace is protected from said flame by said deposit.

5. The method defined in claim 2 wherein said deposit has an upper edge and a lower edge and said slag has an upper surface and a lower surface, said slag and said melt being withdrawn in such a manner that said upper surface of said slag lies always below said upper edge of said deposit and said lower surface of said slag lies above said lower edge of said deposit.

* * * * *